Jan. 22, 1935. O. BÖHM ET AL 1,988,434
ANTENNA SYSTEM
Filed Dec. 12, 1931   3 Sheets-Sheet 1

INVENTORS
DRS. OTTO BOHM
GERHARD B. HAGEN AND
BY HANS OTTO ROOSENSTEIN
ATTORNEY

Jan. 22, 1935.  O. BÖHM ET AL  1,988,434
ANTENNA SYSTEM
Filed Dec. 12, 1931   3 Sheets-Sheet 2
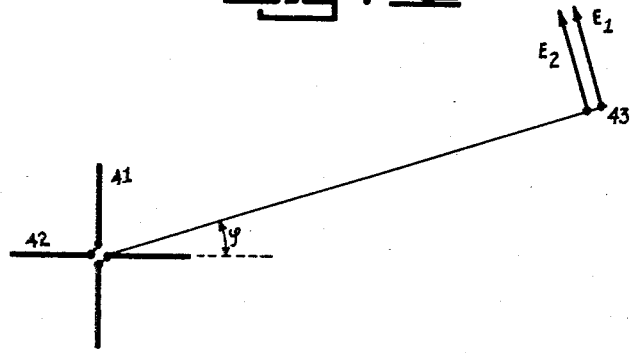
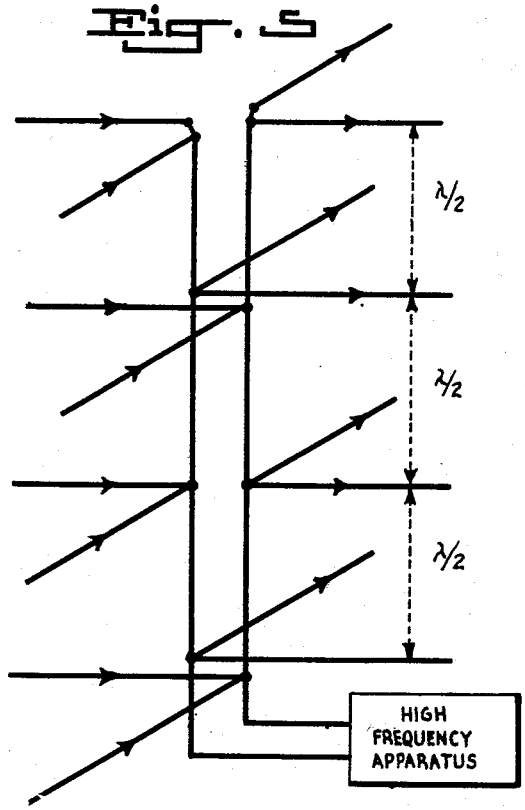
INVENTORS
DRS. OTTO BOHM
GERHARD B. HAGEN AND
BY HANS OTTO ROOSENSTEIN
ATTORNEY Jan. 22, 1935.    O. BÖHM ET AL    1,988,434
ANTENNA SYSTEM
Filed Dec. 12, 1931    3 Sheets-Sheet 3
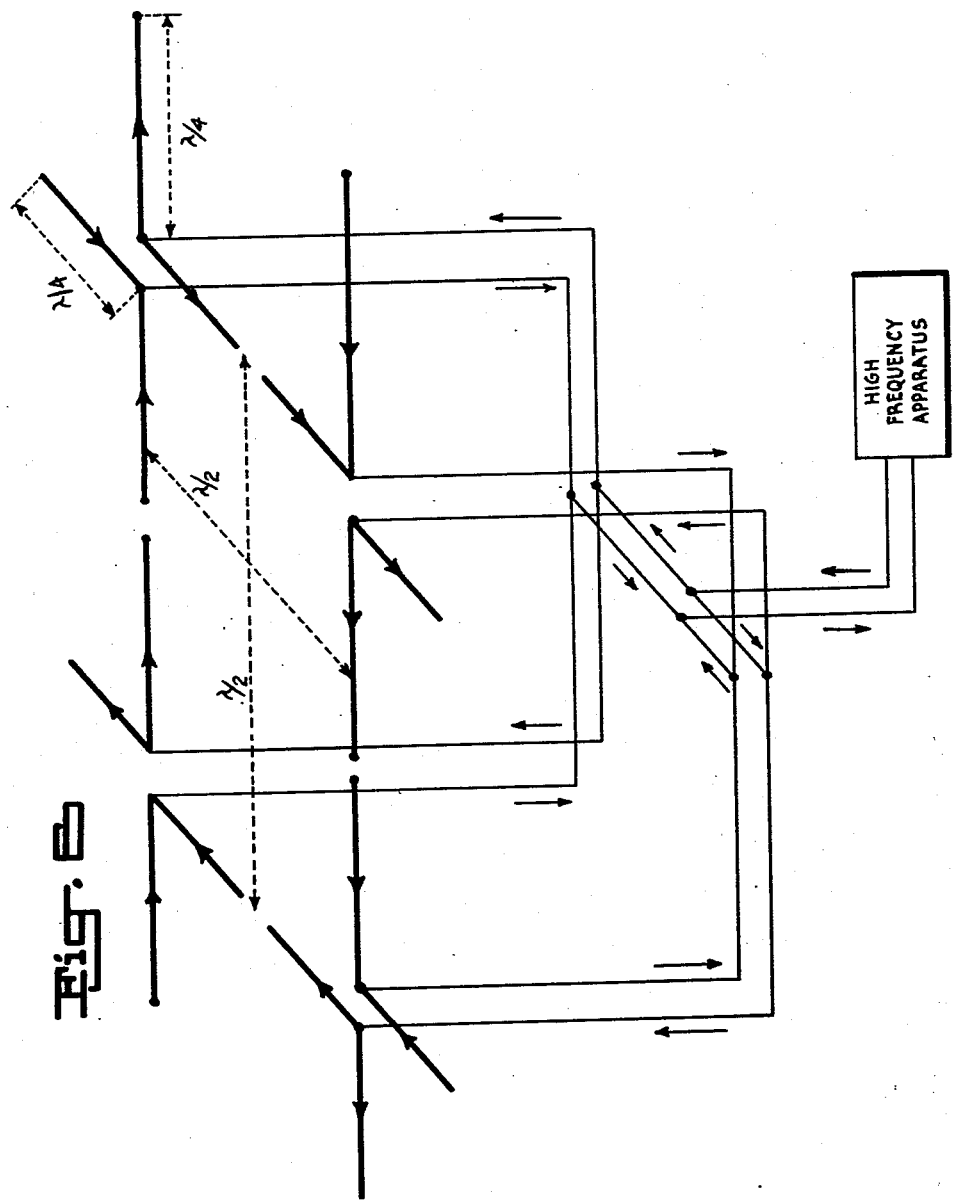
INVENTORS
DRS. OTTO BÖHM
GERHARD B. HAGEN
BY HANS OTTO ROSENSTEIN
ATTORNEY Patented Jan. 22, 1935

1,988,434

UNITED STATES PATENT OFFICE 1,988,434

ANTENNA SYSTEM

Otto Böhm, Gerhard B. Hagen, and Hans Otto Roosenstein, Berlin, Germany, assignors to Telefunken Gesellschaft für Drahtlose Telegraphie m. b. H., Berlin, Germany, a corporation of Germany Application December 12, 1931, Serial No. 580,542
In Germany December 12, 1930

7 Claims. (Cl. 250—33)

This invention relates to aerial systems.

It is a well known fact that in a circuit coupled with an alternating current circuit and which is slightly detuned with respect to the exciting circuit the current leads or lags behind the current in the exciting circuit by a phase angle the amount of which is governed by the extent of detuning of the two circuits in relation to each other. For example, when coupling two antennæ tuned to dissimilar wave lengths with an exciting or primary radio frequency circuit then there exists a phase angle between the currents induced in the said two antennæ. According to the present invention this phenomenon is utilized for the regulation of the phase relations in aerial systems by detuning the antenna elements of the system and which are coupled with a common energy-transfer line in accordance with the phase angles they are desired to present in reference to one another. It is advantageous in this scheme to choose the working frequency between the resonance frequencies of the antenna elements; for instance, it may be the arithmetic mean thereof.

The invention is described more in detail in the following specification, which is accompanied by drawings in which Figures 1 to 6 show various antenna arrangements embodying the principles of the present invention.

Figure 1:
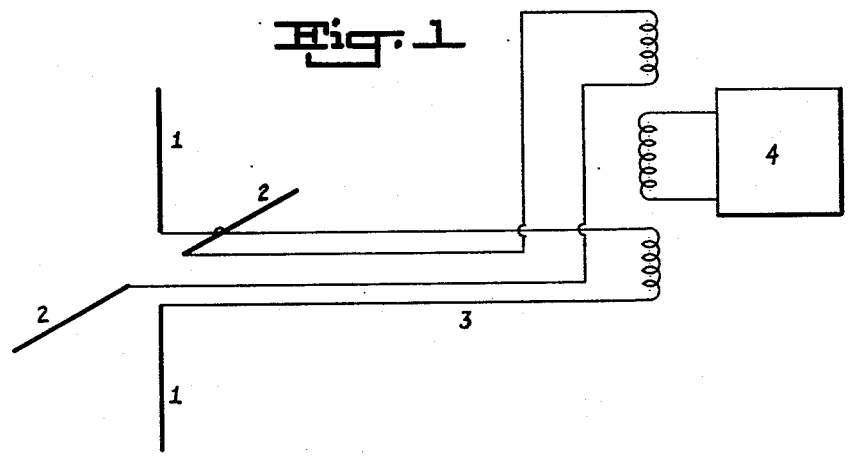

Antennæ built along the line of the present disclosure are useful for the transmission and reception of circularly and elliptically polarized waves. What is used for this purpose are two systems by differently polarized radiations which in Figure 1 are for simplicity's sake shown as two dipole antennæ at right angles to each other. These two aerial systems according to this invention are slightly detuned in relation to each other and they are fed from the same radio frequency source or associated with the same receiver set. For example, a system for circularly polarized radiation or reception is obtained with an arrangement of the kind shown in Figure 1 provided the two antennæ 1 and 2 are thus tuned:

$$\omega_1 = \omega_0 (1 + \zeta/2\pi)$$

$$\omega_2 = \omega_0 (1 - \zeta/2\pi)$$

where $\omega_0$ is the fundamental frequency of the two antennæ 1 and 2 including their leads and tuning elements, and $\zeta$ the decrement of the two aerial arrangements. Of course, $\zeta$ and $\omega_0$ as a general rule need not be assumed to be alike.

One particular simplification is obtained when the tuning means and/or the supply leads of the two radiator systems are made common or joint, and if the requisite tuning differences are insured merely by having the systems themselves present a slight difference in reference to each other, say, a difference in length or in the wire gauge or a difference in the insulator capacities, etc.

Figure 2:
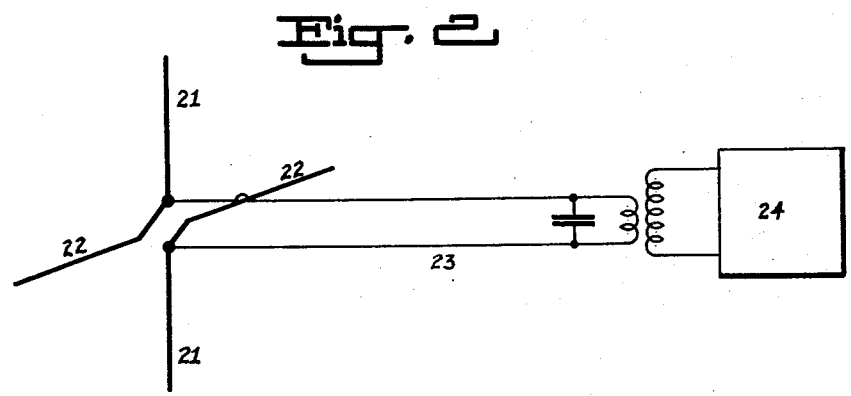
Figure 3:
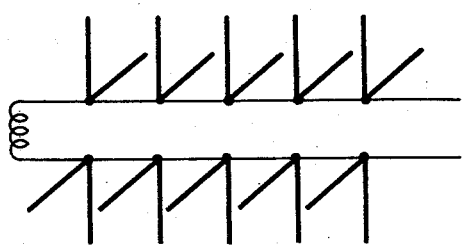

Figure 2 shows by way of example an arrangement in which the said principle is incorporated and which in the direction at right angles to the antenna cross there results a circularly polarized radiation pattern. What is used are two dipoles 21 and 22 each one of which is tuned to a point close to the working wave, which therefore presents an electrical length of approximately $m\lambda/4$ (where $m$ is a whole number) and which are jointly united with the energy line 23. In the case of circularly polarized radiation the detuning of the dipoles should be chosen so large that the intensity of the current in one of the dipoles leads the resonance current by an angle of 45 degrees whereas the current lags in the other dipole by an angle of 45 degrees.

The arrangements hereinbefore described, of course, may be combined to result in such radiator or beam systems, reflectors, etc., as are known in the earlier art.

A directional antenna system suited especially for the transmission of short waves consists of a Beverage antenna in which is used a double line provided with transversal radiators and being a multiple of several half-waves. By way of the transversal radiators extending outwardly from the double line and disposed at close proximity to each other, the space wave, as it were, is built up in the space, with the result that the radiation is increased compared with what it is with a simple Beverage antenna.

Within the scope of the present disclosure (Figure 3) two transverse radiator systems arranged at right angles to each other are provided for each longitudinal conductor of the Beverage antenna which, as in Figure 1, are detuned in reference to each other. It is likewise feasible to provide more than two transversal radiator systems presenting an angle to one another, and in that case the detuning should be chosen correspondingly.

The present invention is greatly suited also for broadcast antennæ if the antenna plane is roughly horizontal. Figure 4 shows a plan of this arrangement which consists of two antennæ 41 and 42 which are disposed at right angles to each other and which present a phase angle between the currents thereof of approximately 90 degrees. At point 43 which is a great distance from the sending antennæ 41 and 42, the electric field intensity $E_1$ of the antenna 41, disregarding the influence of the ground, is calculated in accordance with a well known formula, viz.:

$$E_1 = \cos \omega t \cdot \cos \phi \cdot \text{Constant}$$

where the constant is a function of the meter-ampere of antenna 41 and of the distance 41/43. The same thing holds true for the field intensity $E_2$ arising at point 43 from the antenna 42, thus $$E_2 = \sin \omega t \cdot \sin \phi \cdot \text{Constant}.$$

By the addition of these two equidirectional field intensities, the aggregate field strength E at point 43 turns out to be $$E = \cos (\omega t - \phi) \cdot \text{Constant}.$$

This equation shows that the amplitude of the radiation in all senses is equally strong so that the arrangement is suited as a broadcast antenna. Whenever the two antennæ 41 and 42 are not small compared with a half wave then the derivation of the above equations is no longer exact. The discrepancies that are found, however, are so slight that they will not be appreciable in practice. Wherever it is planned to use such an arrangement for transmission or reception with another than a circular directional diagram it is recommendable to mount the antennæ not exactly under or at an angle of 90 degrees and/or to make the strengths of the current in the two antennæ of such a difference in size or phase that there results the desired directional preference.

In order that the radiation may essentially be confined to the horizontal plane the known arrangements which are used in connection with simple antennæ should be employed. For instance, Figure 5 illustrates an arrangement comprising a plurality of horizontal antenna crosses as described above which by the interposition of leads or lines having electrical lengths λ/2 are interconnected. The antenna crosses are connected with the line alternately directly and crosswise in order that the currents in the equi-directed dipoles may become co-phasic and that a horizontally beamed radiation may be secured.

This arrangement for broadcast radiation or broadcast reception does not present any marked vertical component or radiation which is wasted for transmission and which, in the case of reception would merely mean an increased chance for the picking up of atmospherics. With the same end in view it is possible to arrange a plurality of antenna crosses in a horizontal plane, and to choose the phases of the currents in the paralleled antennæ in such a way that radiation in the vertical direction becomes equal to zero.

A simple arrangement for only four antenna crosses is shown in Figure 6. As indicated by the arrow in the different dipoles the current in each pair of equidirected antennæ is in phase opposition, a condition that is secured by the connection of the feed line as shown. Since the distance between the midpoints of adjacent antenna crosses is equal to one-half wave length the radiation in the antenna plane becomes equal to the sum of radiations in the constituent antennæ. But if the distance between midpoints of neighboring antenna crosses is not exactly equal to ½ wave length, or if the equidirected dipoles of these antenna crosses do not present exactly the phase opposition before referred to, then the arrangement will have a more or less unidirectional radiation which quite often will be advantageous and useful.

What is claimed is:

1. A radio communication system comprising two antennae and an energy transfer line, each of said antennae being coupled to said transfer line and detuned with respect to each other, and each of said antennae being tuned to a resonance frequency which differs from the frequency of the working signal wave, the frequency of said working signal wave being between the resonance frequencies of said antennae.

2. A broadcasting antenna system comprising a plurality of radiators located in the horizontal plane in such manner that their centers lie on the same vertical axis while their directions form a desired angle, means including a two wire transmission line for supplying said radiators with currents displaced in phase with respect to each other, a similar antenna arrangement located in the same horizontal plane and coupled to said same means, the corresponding antennae of said systems which are in similar locations and extend in the same directions being connected to different wires of said transmission line whereby they have currents therein which are in phase opposition with respect to each other.

3. An antenna system comprising a horizontal dipole consisting of two separated linear radiators in the same straight line, another dipole in the same horizontal plane also consisting of two separated linear radiators in a straight line, both dipoles having their effective centers lying on the same vertical axis and being disposed to form a desired angle with respect to each other, each radiator of each dipole being directly connected to a radiator of the other dipole, a two wire transmission line connected to said dipoles at the junction points between radiators, and high frequency apparatus coupled to said transmission line, said two dipoles being slightly detuned in relation to one another with respect to a fundamental frequency.

4. A system as defined in claim 3, characterized in this, that said dipoles are disposed at 90 degrees with respect to each other.

5. A radio communication arrangement comprising two transverse radiator systems, each of said systems consisting of two linear separated radiators on the same straight line, each radiator of each system being directly joined to a radiator of the other system, a two wire transmission line which is long relative to the wave length connected to said radiators at their junction points and coupled to high frequency apparatus, and other similar transverse radiator systems in planes parallel to said first systems extending outwardly from said two wire line and disposed in close proximity to each other.

6. An antenna system comprising a dipole consisting of two separated linear radiators in the same straight line, another dipole in the same plane also consisting of two separated linear radiators in a straight line, both dipoles having their effective centers lying on the same vertical axis and being disposed to form a desired angle with respect to each other, each radiator of each dipole being directly connected to a radiator of the other dipole, a two wire transmission line connected to said dipoles at the junction points between the radiators, and high frequency apparatus coupled to said transmission line, one of said dipoles being detuned to effect a leading current therein substantially of an angle of 45° with respect to the resonance current and the other of said dipoles being detuned to effect a lag substantially of an angle of 45° of the current therein with respect to the resonance current whereby circularly polarized radiation is obtained from said antenna system.

7. An antenna system comprising a horizontal dipole consisting of two separated linear radiators in the same straight line, another dipole in the same horizontal plane also consisting of two separated linear radiators in a straight line, both dipoles having their effective centers lying on the same vertical axis and being disposed to form a desired angle with respect to each other, each radiator of each dipole being directly connected to a radiator of the other dipole, a two wire transmission line connected to said dipoles at the junction points between radiators, and high frequency apparatus coupled to said transmission line, said two dipoles being slightly detuned in relation to one another with respect to a fundamental frequency, and another similar pair of dipole antennae in a parallel horizontal plane and connected to the same transmission line, correspondingly disposed antennae elements of said two pairs of dipole antennae being coupled to different wires of said transmission line.

OTTO BÖHM.
GERHARD B. HAGEN.
HANS OTTO ROOSENSTEIN.